(12) United States Patent
Nusier et al.

(10) Patent No.: US 11,161,550 B2
(45) Date of Patent: Nov. 2, 2021

(54) VEHICLE DEFLECTOR ASSEMBLY AND LOAD ABSORBING METHOD

(71) Applicant: Ford Global Technologies, LLC, Dearborn, MI (US)

(72) Inventors: Saied Nusier, Canton, MI (US); Mohamed Ridha Baccouche, Ann Arbor, MI (US); Saeed David Barbat, Novi, MI (US); Jamel E. Belwafa, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 106 days.

(21) Appl. No.: 16/825,382

(22) Filed: Mar. 20, 2020

(65) Prior Publication Data

US 2021/0291906 A1 Sep. 23, 2021

(51) Int. Cl.
| | | |
|---|---|---|
| *B60J 7/00* | (2006.01) | |
| *B62D 21/15* | (2006.01) | |
| *B60R 19/34* | (2006.01) | |
| *B62D 25/08* | (2006.01) | |
| *B60R 19/18* | (2006.01) | |
| *B60R 19/24* | (2006.01) | |
| *B60R 21/00* | (2006.01) | |
| *B62D 21/02* | (2006.01) | |

(52) U.S. Cl.
CPC ........... *B62D 21/152* (2013.01); *B60R 19/34* (2013.01); *B60R 19/18* (2013.01); *B60R 2019/1813* (2013.01); *B60R 2019/247* (2013.01); *B60R 2021/0023* (2013.01); *B62D 21/02* (2013.01); *B62D 25/082* (2013.01)

(58) Field of Classification Search
CPC ... B60L 2200/26; B65G 2201/02; B28B 7/22; B60G 11/04; B60S 13/00; B60F 1/046; B64D 7/08; E01B 7/14; F02D 41/403
See application file for complete search history.

(56) References Cited

U.S. PATENT DOCUMENTS

| | | | | |
|---|---|---|---|---|
| 8,398,153 | B1 * | 3/2013 | Dandekar | B62D 21/152 296/187.09 |
| 8,398,154 | B1 * | 3/2013 | Nusier | B62D 21/152 296/187.1 |
| 8,991,903 | B1 | 3/2015 | Alavandi et al. | |
| 9,180,829 | B1 * | 11/2015 | Baccouche | B60R 19/03 |
| 9,272,678 | B2 | 3/2016 | Nam et al. | |
| 9,415,735 | B1 * | 8/2016 | Baccouche | B60R 19/34 |
| 9,457,746 | B1 * | 10/2016 | Baccouche | B62D 21/152 |
| 10,464,609 | B2 * | 11/2019 | Ahmed | B62D 25/085 |
| 2009/0315365 | A1 * | 12/2009 | Baccouche | B62D 21/152 296/205 |
| 2012/0248820 | A1 * | 10/2012 | Yasui | B60R 19/34 296/187.09 |

(Continued)

*Primary Examiner* — Kiran B Patel
(74) *Attorney, Agent, or Firm* — David Coppiellie, Esq.; Carlson, Gaskey & Olds, P.C.

(57) ABSTRACT

A vehicle frame assembly includes, among other things, a lower main rail of a vehicle, a deflector assembly that is disposed adjacent a forward end portion of the lower main rail, and a positioning bracket of the deflector assembly. The positioning bracket is secured directly to the lower main rail and configured to separate from the lower main rail if a load that exceeds a threshold load is applied to a front of the vehicle.

19 Claims, 3 Drawing Sheets

(56) References Cited

U.S. PATENT DOCUMENTS

| | | | | |
|---|---|---|---|---|
| 2013/0278013 A1* | 10/2013 | Baccouche | ............ | B60R 21/013 |
| | | | | 296/187.1 |
| 2014/0091585 A1* | 4/2014 | Ramoutar | ................ | B60R 19/24 |
| | | | | 293/133 |
| 2014/0246880 A1* | 9/2014 | Barbat | ................. | B62D 21/152 |
| | | | | 296/187.1 |
| 2015/0021935 A1* | 1/2015 | Baccouche | ............. | B60R 19/34 |
| | | | | 293/114 |
| 2015/0035316 A1* | 2/2015 | Kuriyama | ............ | B62D 25/082 |
| | | | | 296/187.1 |
| 2015/0102635 A1* | 4/2015 | Barbat | ................. | B62D 21/152 |
| | | | | 296/187.1 |
| 2015/0158441 A1* | 6/2015 | Nusier | ................. | B62D 21/152 |
| | | | | 293/133 |
| 2015/0274209 A1* | 10/2015 | Basappa | ................. | B60R 19/04 |
| | | | | 180/271 |
| 2017/0291642 A1* | 10/2017 | Nusier | ................. | B60R 19/023 |
| 2019/0256021 A1* | 8/2019 | Zierer | ..................... | B60R 19/34 |
| 2021/0114664 A1* | 4/2021 | Baccouche | ............ | B62D 27/02 |

* cited by examiner

VEHICLE DEFLECTOR ASSEMBLY AND LOAD ABSORBING METHOD

TECHNICAL FIELD

This disclosure relates generally to frame structures of a vehicle and, more particularly, to a deflector assembly that can laterally deflect loads during a frontal impact.

BACKGROUND

Vehicles designs can undergo many tests. One such test, simulates small offset frontal impacts against a rigid barrier. During such a test, an impact load is applied to a front of the vehicle at a position outboard of one of the main rails.

SUMMARY

A vehicle frame assembly according to an exemplary aspect of the present disclosure includes, among other things, a lower main rail of a vehicle, a deflector assembly adjacent a forward end position in front of the lower main rail, and a positioning bracket of the deflector assembly. The positioning bracket is secured directly to the lower main rail and configured to separate from the lower main rail if a load that exceeds a threshold load is applied to a front of the vehicle.

Another example of the foregoing frame assembly includes at least one weld that secures the positioning bracket to the lower main rail. The weld is configured to sever in response to the load to separate the positioning bracket from the lower main rail.

In another example of any of the foregoing frame assemblies, at least one attachment directly couples the positioning bracket to an outboard surface of the lower main rail.

In another example of any of the foregoing frame assemblies, the load is applied to the vehicle at a position outboard the lower main rail.

In another example of any of the foregoing frame assemblies, the positioning bracket includes an upper horizontally extending flange disposed alongside a top side of the lower main rail, a vertically extending flange disposed along a laterally outboard side of the lower main rail, and a lower horizontally extending flange disposed alongside a bottom side of the lower main rail.

In another example of any of the foregoing frame assemblies, the positioning bracket has a C-shaped cross-sectional profile.

Another example of any of the foregoing frame assemblies includes a first member and a second member of the deflector assembly. The first member is supported by the second member. The first member has a first end portion disposed on an inboard side of the lower main rail, and an opposing, second end portion that extends laterally outward away from the lower main rail. The second member has a first end portion that faces laterally inward and is adjacent a laterally facing side of the first member. The second member has an opposing second end portion that faces laterally inward and is directly connected to the positioning bracket.

In another example of any of the foregoing frame assemblies, the second member is directly connected to a forward end portion of the lower main rail.

In another example of any of the foregoing frame assemblies, the first end portion of the second member is directly connected to the laterally facing side of the first member.

In another example of any of the foregoing frame assemblies, the first and second members are extruded structures.

In another example of any of the foregoing frame assemblies, the lower main rail is vertically aligned with a rocker assembly of the vehicle.

Another example of any of the foregoing frame assemblies includes an upper main rail. The lower main rail is vertically beneath the upper main rail.

Another example of any of the foregoing frame assemblies, includes a bumper beam and a crush-can that are vertically above and vertically spaced from the lower main rail.

In another example of any of the foregoing frame assemblies, the crush-can is vertically aligned with a forward end portion of the upper main rail, and the crush-can is horizontally between the bumper beam and the forward end portion of the upper main rail.

A vehicle frame assembly according to another exemplary aspect of the present disclosure includes, among other things, an upper main rail of a vehicle, a crush-can and a bumper beam supported by the upper main rail at a forward end portion of the upper main rail, and a lower main rail of a vehicle. The lower main rail is vertically beneath the upper main rail, the crush-can, and the bumper beam. The assembly further includes a deflector assembly supported by the lower main rail at a forward end portion of the lower main rail. A positioning bracket of the deflector assembly is secured directly to the lower main rail and configured to separate from the lower main rail if a load that exceeds a threshold load is applied to a front of the vehicle. The positioning bracket includes an upper horizontally extending flange disposed alongside a top surface of the lower main rail, a vertically extending flange disposed along a laterally outboard side of the lower main rail, and a lower horizontally extending flange disposed alongside a bottom side of the lower main rail.

A vehicle frame load absorbing method according to yet another exemplary aspect of the present disclosure includes, among other things, securing a member of a deflector assembly to a forward end portion of a lower main rail, and attaching a positioning bracket of the deflector assembly to another area of the lower main rail. The positioning bracket is configured to detach from the lower main rail in response to a load that exceeds a threshold load being applied to a front of the vehicle.

In another example of the foregoing method, detaching the positioning bracket permits the positioning bracket to slide horizontally relative to the lower main rail.

In another example of any of the foregoing methods, the positioning bracket is attached to the deflector assembly using at least one weld.

In another example of any of the foregoing methods, the load is a load applied at a position laterally outside the lower frame rail.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to a deflector assembly that can absorb and manage kinetic energy when a frontal impact load is applied to a vehicle, particularly a load that is applied laterally outboard of an upper and lower main rail of the vehicle frame. The deflector assembly can help to absorb and manage loads during, for example, a test that simulate small offset frontal impacts against a rigid barrier. At least a portion of the deflector assembly can be disposed in front of the lower main rail. The deflector assembly can be used with many types of vehicle frames, especially those vehicle frames having main rails located closer to a centerline of the vehicle.

Figure 1:
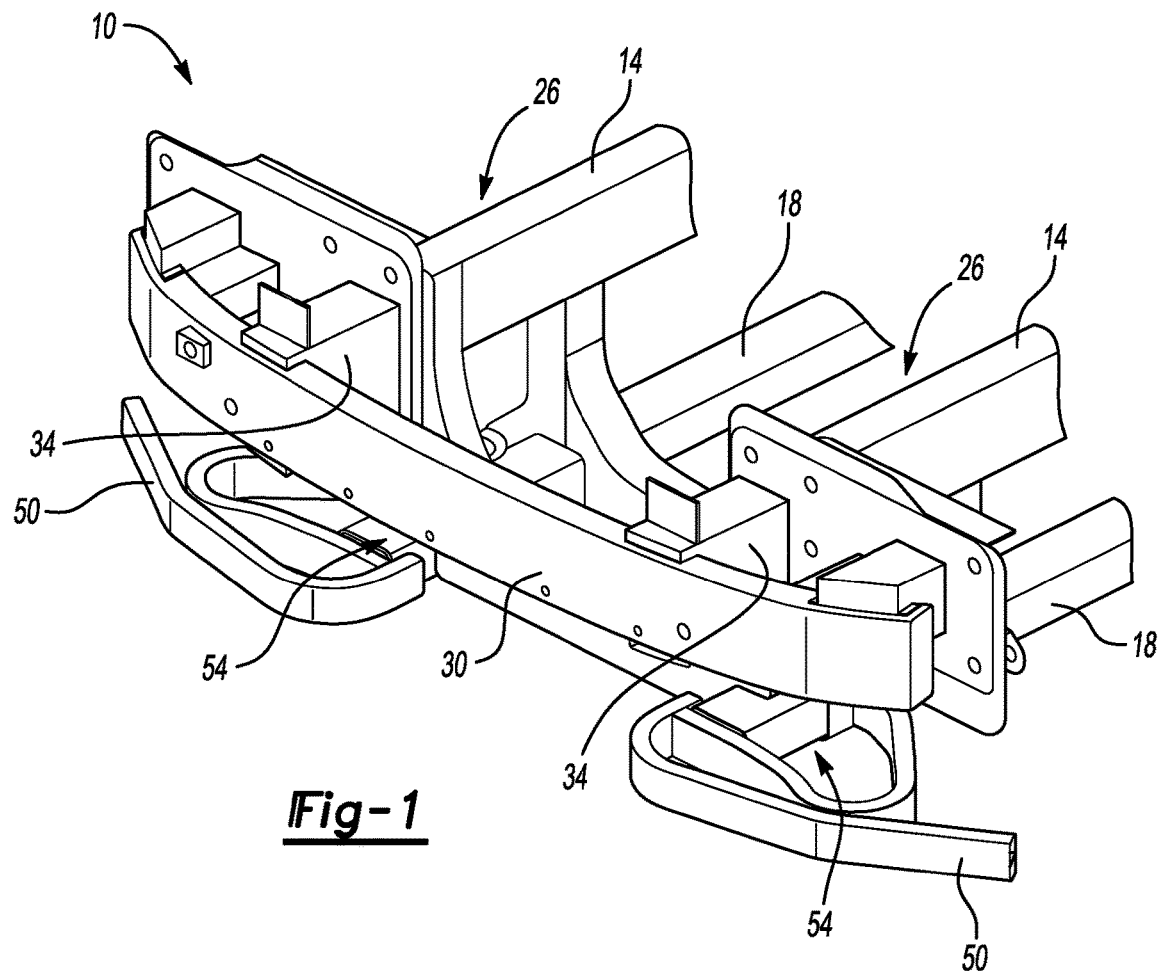
FIG. 1 illustrates a perspective view of a front end of a vehicle frame.
Figure 2:
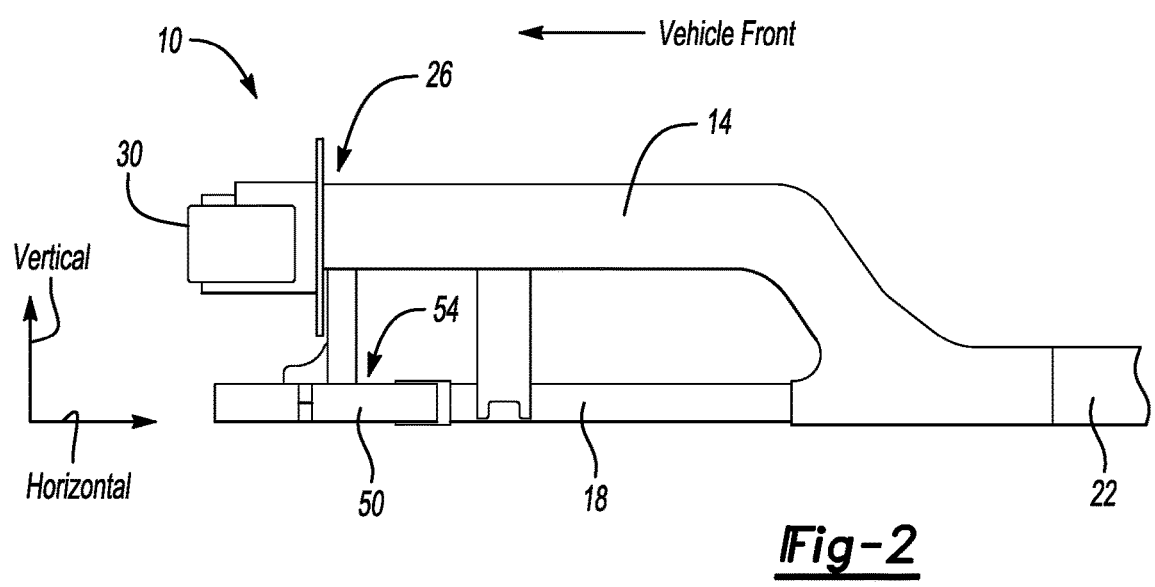
FIG. 2 illustrates a side view of the front end of the vehicle frame of FIG. 1.

With reference to FIGS. 1 and 2, a vehicle frame 10 includes a pair of upper main rails 14, a pair of lower main rails 18, and a pair of rocker assemblies 22. The upper main rails 14 are laterally spaced apart from one another. The lower main rails 18 are also laterally spaced from one another, as are the rocker assemblies 22.

The lower main rails 18 are substantially vertically aligned with the rocker assemblies 22. The upper main rails 14 extend upward from rocker assemblies 22 and terminate at respective forward end portions 26 that are vertically above and spaced from the lower main rails 18. The upper main rails 14 are thus vertically above the lower main rails 18.

Vertical, for purposes of this disclosure, is with reference to ground and a general orientation of the frame 10 when the frame 10 is within a vehicle. Forward and rearward, as used in this disclosure, are also with reference to the general orientation of the frame 10 within a vehicle. Forward is associated with a front of the vehicle, and rearward is associated with a rear of the vehicle.

A bumper beam 30 and crush-can assemblies 34 are disposed in front of the forward end portions 26 of the upper main rails 14. The bumper beam 30 spans laterally in a cross-vehicle direction from the forward end portion 26 of the upper main rail 14 on a driver side of the frame 10 to the forward end portion 26 of the upper main rail 14 on a passenger side of the frame 10.

The bumper beam 30 and crush-can assemblies 34 are vertically aligned with forward end portions 26 of the upper main rails 14. The crush-can assemblies 34 are disposed horizontally between the bumper beam 30 and the forward end portions 26 of the upper main rails 14.

A vehicle bumper (not shown) can attach to the bumper beam 30. A force, such as an impact load, applied to the front bumper can pass through the bumper beam 30 to the crush-can assemblies 34. The crush-can assemblies 34 can yield in response to the force to help manage energy distribution within the frame 10.

Figure 3:
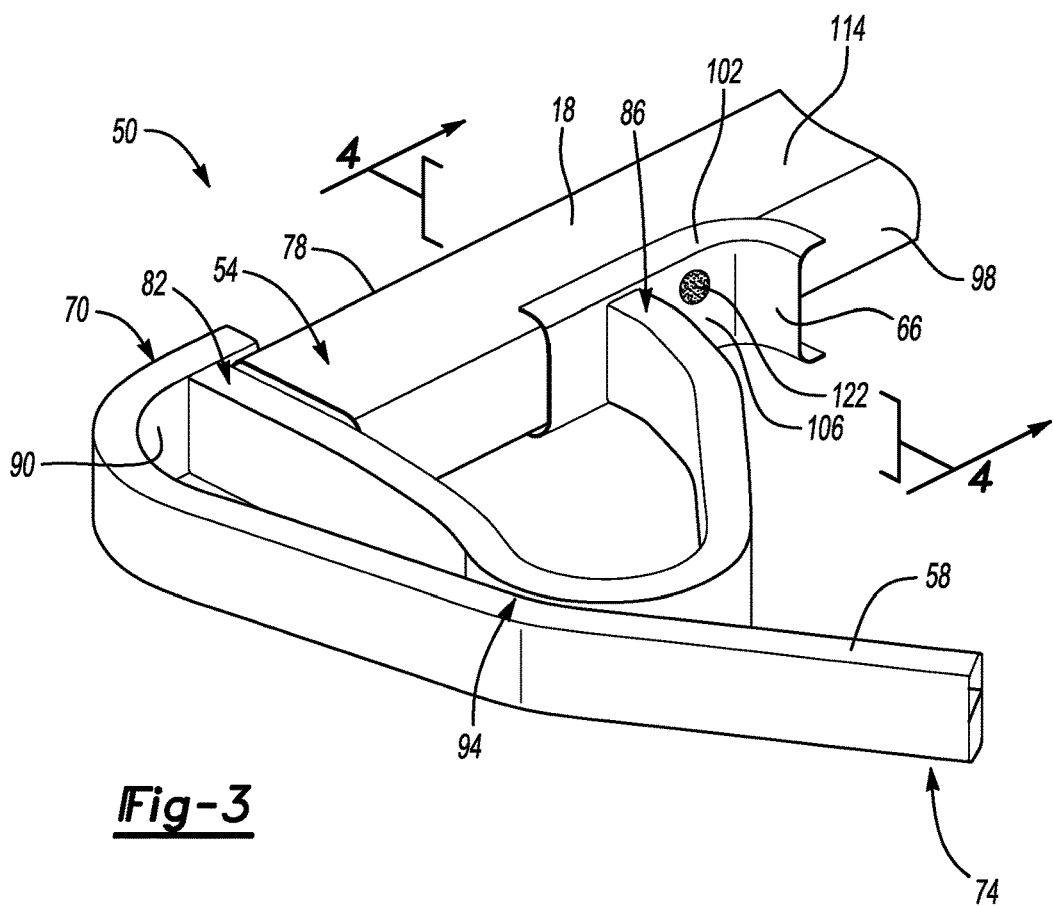
FIG. 3 illustrates a perspective view of a deflector assembly secured to a lower main rail on a driver side of the vehicle frame of FIG. 1.
Figure 4:
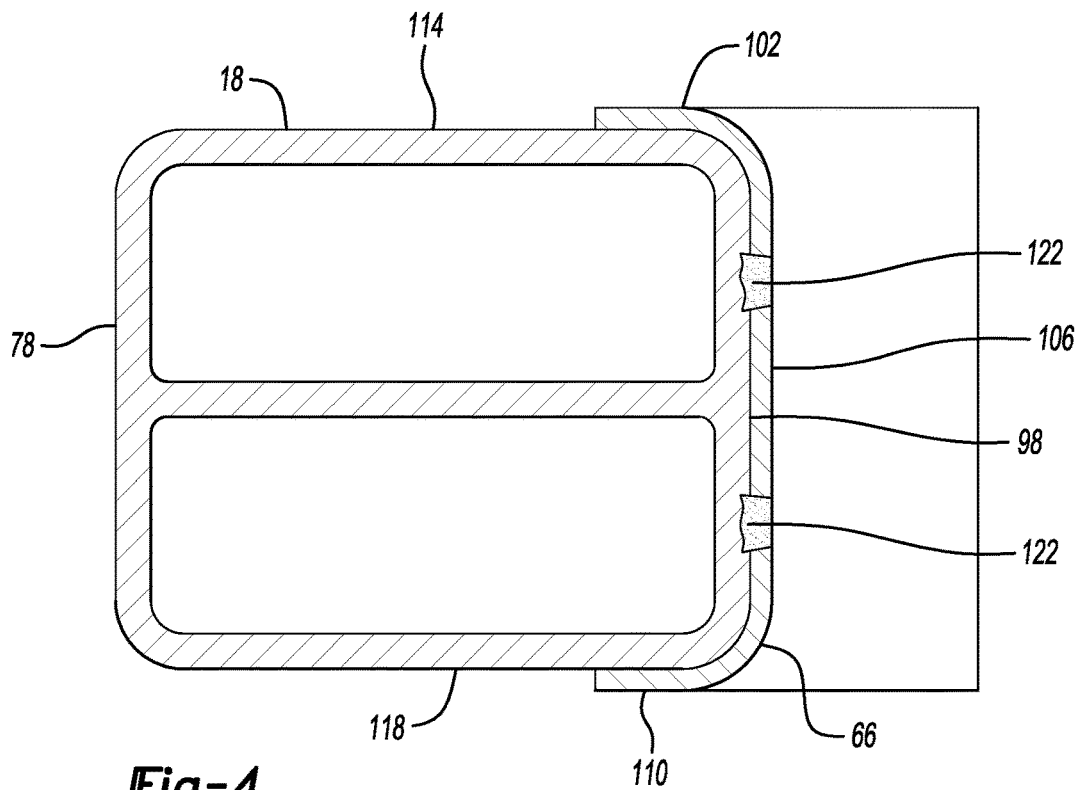
FIG. 4 illustrates a section view taken at line 4-4 in FIG. 3.

With reference to FIGS. 3 and 4, and continuing reference to FIGS. 1 and 2, the frame 10 includes a pair of deflector assemblies 50 that are disposed vertically beneath the forward end portion 26 of the upper main rails 14, the bumper beam 30, and the crush-can assemblies 34. The deflector assemblies 14 are each at least partially disposed in front of a respective forward end portion 54 of the lower main rails 18. One of the deflector assemblies 50 is adjacent the forward end portion 54 of the lower main rail 18 on a driver side of the frame 10. The other deflector assembly 14 is adjacent the forward end portion 54 of the lower main rail 18 on a passenger side of the frame 10.

Some vehicle tests replicate a vehicle impacting with a rigid barrier that is outboard the upper main rails 14 and outboard the lower main rails 18. During such tests, the crush-can assemblies 34 can absorb some load. In the exemplary embodiment, the deflector assemblies 14 also utilized to absorb and redirect the load and to reduce relative movement of the rigid barrier into the frame 10. The deflector assemblies 50 can redirect loads to the associated lower main rail 18 while additionally helping to slide or push the vehicle away from the rigid barrier.

The deflector assembly 50 on the driver side of the frame 10 includes, in an exemplary embodiment, a first member 58, a second member 62, and a positioning bracket 66. The deflector assembly 14 on the passenger side of the frame 10 is similarly constructed. In an example, the construction of deflector assembly 14 on the passenger side of the frame 10 is nominally identical to the deflector assembly 14 on the driver side, but flipped about a longitudinal axis of the frame 10 when in an installed position.

The first member 58, the second member 62, and the positioning bracket 66 can be metal or metal alloy, such as aluminum. The first member 58 and the second member 62 can be extruded aluminum, for example. A person having skill in this art and the benefit of this disclosure would be able to structurally distinguish an extruded structure from a structure that is not extruded. Thus, specifying that a structure is extruded implicates structure.

The first member 58 extends from a first end portion 70 to a second end portion 74. The first end portion 70 is turned to face the rear of the frame 10. The first member 58 is curved such that the first end portion 70 is disposed along an inboard side 78 of the lower main rail 18. The first member 58 is curved such that the second end portion 74 extends laterally outward and slightly rearward.

The second member 62 extends from a first end portion 82 to a second end portion 86. The first end portion 82 faces inboard and is adjacent a laterally facing side 90 of the first member 58. In this example, the first end portion 82 is directly attached to the laterally facing side 90 via, for example, welds. The second member 62 can additionally directly attach to the first member 58 at area 94. Welds, for example, could also be used to attach the second member 62 to the first member 58 in the area 94. The first member 58 can be supported exclusively by its attachment to the second member 62 at the first end portion 82 and the area 94. The first end portion 82 of the second member 62 can be directly attached to the forward end portion 54 of the lower main rail 18 using, for example, bolts or welds.

The second member 62 is curved such that the second end portion 86 also faces inboard. In this example, the second end portion 86 is directly attached to the positioning bracket 66, which is disposed along an outboard side 98 of the lower main rail 18. Welds could be used to attach the second end portion 86 to the positioning bracket 66.

The positioning bracket 66 includes an upper horizontally extending flange 102, a vertically extending flange 106, and a lower horizontally extending flange 110. The upper horizontally extending flange 102 is disposed adjacent a top surface 114 of the lower main rail 18. The vertically extending flange 106 is disposed adjacent the laterally outboard side 98 of the lower main rail 18. The lower horizontally extending flange 110 is disposed adjacent a bottom side 118 of the lower main rail 18.

The positioning bracket 66 is secured, in this embodiment, to the lower main rail 18 via at least one attachment 122. In the exemplary embodiment, the at least one attachment 122 is a plurality of spot welds. Other types of attachments could be used in other examples. The at least one attachment 122 could instead be one or more mechanical fasteners, for example.

In response to a load, the first member 58 and the second member 62 can deform. The deformation of the first member 58 and the second member 62 can help to absorb the load. The deformation can reduce a peak load applied to the vehicle and minimize deformation into the vehicle by lengthening a time that the load is applied.

Further, the positioning bracket 66 can slide relative to the lower main rail 18 in response to the load. The flanges 102, 106, 110 of the positioning bracket 66 can help to hold the vertical position of the first member 58 and the second member 62 during deformation and sliding.

Due to the flanges 102, 106, 110, the positioning bracket 66 has a cupped or C-shaped configuration as shown in the cross-section of FIG. 4. This shape of the positioning bracket 66 helps to maintain positioning of the positioning bracket 66 relative to the lower main rail 18, especially vertical positioning, if a load above a threshold load is applied to a front of the vehicle. For example, if a load is applied that attempts to move the positioning bracket 66 vertically upward, the horizontally extending flange 110 can contact the bottom side 118 to limit vertical displacement of the positioning bracket 66, and thus the first member 58 and second member 62 relative to the lower main rail 18.

In some examples, the at least one attachment 122 can be configured to shear if a load above a threshold load is applied to a front of the frame 10 outboard the lower main rail 18. When such the load is applied, the at least one attachment 122 can shear such that the positioning bracket 66 is no longer directly attached to the lower main rail 18. Shearing the at least one attachment 122 can permit some rearward movement of the positioning bracket 66 relative to the lower main rail 18. Even after the shearing of the at least one attachment 122, the cup-shaped profile of the positioning bracket 66 can help to guide sliding movement of the positioning bracket 66 relative to the lower main rail 18. In an example, the at least one attachment 122 shears in response to an applied load of 1000 lbf, and the positioning bracket 66 slides relative to the lower main rail 18 in response to an applied load of more than 15,000 lbf.

Prior to shearing, the at least one attachment 122 stabilizes the positioning bracket 66 relative to the lower main rail 18. The at least one attachment 122, for example, helps to prevent vibration of the positioning bracket 66 and remaining portions of the deflector assembly 14 during operation of the vehicle. Other mechanisms could instead or additionally be implemented to limit vibration.

Configuring the at least one attachment 122 to shear in response to a load exceeding a threshold load can be accomplished by, for example, changing a size of the least one attachment 122 or adding or removing attachment locations. If mechanical fasteners are used, a diameter of the mechanical fasteners could be increased or decreased to adjust a load at which the mechanical fasteners shear. A person having skill in the art and the benefit of this disclosure could adjust attachments to provide at least one fastener that shears at a desired threshold load.

Figure 5:
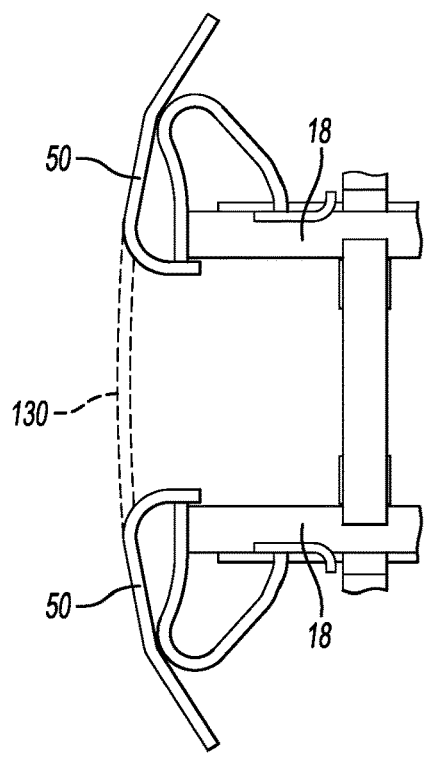
FIG. 5 shows a bottom view of deflector assemblies secured to the lower main rails of the vehicle frame of FIG. 1.

FIG. 5 shows a bottom view of the deflector assemblies 50 secured to the lower main rails prior to a load that exceeds a threshold load being applied to a front of the vehicle. In an example, a member 130, shown in broken lines, could be added to the frame 10 such that the member 130 spans between the deflector assembly 50 on the passenger side and the deflector assembly 50 on the driver side. The member 130 could be a stamped part.

Figure 6:
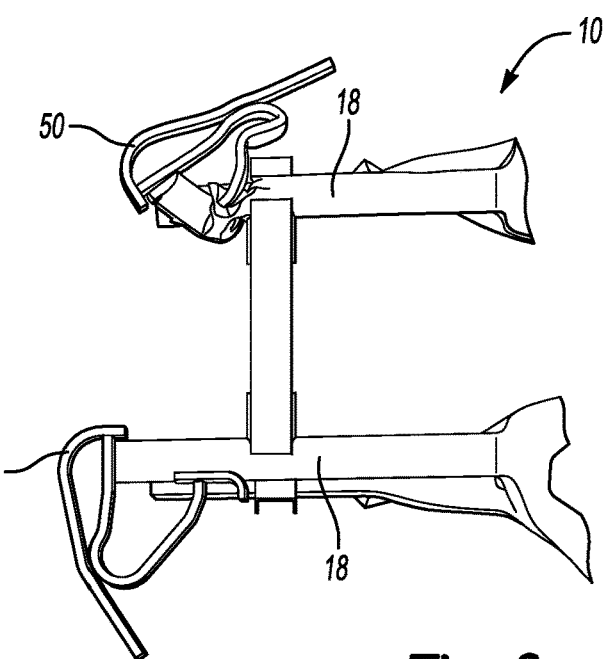
FIG. 6 shows the bottom view of FIG. 5 after a first type of test.

FIG. 6 shows the bottom view of FIG. 5 after the deflector assemblies 50 have responded to a load during a test. The deflectors in FIG. 6, particularly the deflector on the driver side, have absorbed energy by turning, pushing, sliding the positioning bracket, and yielding.

Figure 7:
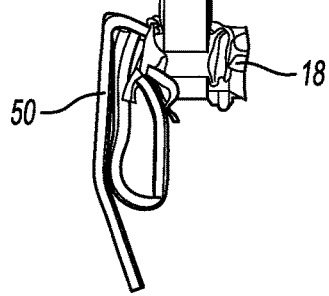
FIG. 7 shows the bottom view of FIG. 5 after a second type of test.

FIG. 7 shows the bottom view of FIG. 5 after the deflector assemblies 50 have responded to a load during a frontal New Car Assessment Program (NCAP) test. The deflectors in FIG. 7 have absorbed energy by, among other things, flattening and yielding.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle frame assembly, comprising:
   a lower main rail of a vehicle;
   a deflector assembly that is disposed adjacent a forward end portion of the lower main rail; and
   a positioning bracket of the deflector assembly, the positioning bracket secured directly to the lower main rail and configured to separate from the lower main rail if a load that exceeds a threshold load is applied to a front of the vehicle.

2. The vehicle frame assembly of claim 1, further comprising at least one weld that secures the positioning bracket to the lower main rail, the at least one weld configured to sever in response to the load to separate the positioning bracket from the lower main rail.

3. The vehicle frame assembly of claim 1, wherein at least one attachment directly couples the positioning bracket to an outboard surface of the lower main rail.

4. The vehicle frame assembly of claim 1, wherein the load is applied to the vehicle at a position outboard the lower main rail.

5. The vehicle frame assembly of claim 1, wherein the positioning bracket includes an upper horizontally extending flange disposed alongside a top side of the lower main rail, a vertically extending flange disposed along a laterally outboard side of the lower main rail, and a lower horizontally extending flange disposed alongside a bottom side of the lower main rail.

6. The vehicle frame assembly of claim 5, wherein the positioning bracket has a C-shaped cross-sectional profile.

7. The vehicle frame assembly of claim 1, further comprising a first member and a second member of the deflector assembly, the first member supported by the second member, the first member having a first end portion disposed on an inboard side of the lower main rail, and an opposing, second end portion extending laterally outward away from the lower main rail, the second member having a first end portion that faces laterally inward and is adjacent a laterally facing side of the first member, the second member having an opposing second end portion that faces laterally inward and is directly connected to the positioning bracket.

8. The vehicle frame assembly of claim 7, wherein the second member is directly connected to the forward end portion of the lower main rail.

9. The vehicle frame assembly of claim 7, wherein the first end portion of the second member is directly connected to the laterally facing side of the first member.

10. The vehicle frame assembly of claim 7, wherein the first and second members are extruded structures.

11. The vehicle frame assembly of claim 1, wherein the lower main rail is vertically aligned with a rocker assembly of the vehicle.

12. The vehicle frame assembly of claim 1, further comprising an upper main rail, the lower main rail vertically beneath the upper main rail.

13. The vehicle frame assembly of claim 12, further comprising a bumper beam and a crush-can that are vertically above and vertically spaced from the lower main rail.

14. The vehicle frame assembly of claim 13, wherein the crush-can is vertically aligned with a forward end portion of the upper main rail, and the crush-can is horizontally between the bumper beam and the forward end portion of the upper main rail.

15. A vehicle frame assembly, comprising:
an upper main rail of a vehicle;
a crush-can and a bumper beam supported by the upper main rail at a forward end portion of the upper main rail;
a lower main rail of a vehicle, the lower main rail vertically beneath the upper main rail, the crush-can, and the bumper beam;
a deflector assembly supported by the lower main rail at a forward end portion of the lower main rail; and
a positioning bracket of the deflector assembly, the positioning bracket secured directly to the lower main rail and configured to separate from the lower main rail if a load that exceeds a threshold load is applied to a front of the vehicle, the positioning bracket including an upper horizontally extending flange disposed alongside a top surface of the lower main rail, a vertically extending flange disposed along a laterally outboard side of the lower main rail, and a lower horizontally extending flange disposed alongside a bottom side of the lower main rail.

16. A vehicle frame load absorbing method, comprising:
securing a member of a deflector assembly to a forward end portion of a lower main rail; and
attaching a positioning bracket of the deflector assembly to another area of the lower main rail, the positioning bracket configured to detach from the lower main rail in response to a load that exceeds a threshold load being applied to a front of the vehicle.

17. The vehicle frame load absorbing method of claim 16, wherein detaching the positioning bracket permits the positioning bracket to slide horizontally relative to the lower main rail.

18. The vehicle frame load absorbing method of claim 16, wherein the positioning bracket is attached to the deflector assembly using at least one weld.

19. The vehicle frame load absorbing method of claim 16, wherein the load is a load applied at a position laterally outside the lower frame rail.

* * * * *

UNITED STATES PATENT AND TRADEMARK OFFICE
CERTIFICATE OF CORRECTION

Page 1 of 1

PATENT NO. : 11,161,550 B2
APPLICATION NO. : 16/825382
DATED : November 2, 2021
INVENTOR(S) : Saied Nusier et al.

It is certified that error appears in the above-identified patent and that said Letters Patent is hereby corrected as shown below:

In the Specification

In Column 4, Line 8; replace "deflector assemblies 14" with --deflector assemblies 50--

In Column 4, Line 12; replace "deflector assembly 14" with --deflector assembly 50--

In Column 4, Line 19; replace "deflector assemblies 14" with --deflector assemblies 50--

In Column 4, Line 28; replace "deflector assembly 14" with --deflector assembly 50--

In Column 4, Line 30; replace "deflector assembly 14" with --deflector assembly 50--

In Column 4, Line 31; replace "deflector assembly 14" with --deflector assembly 50--

In Column 5, Line 62; replace "deflector assembly 14" with --deflector assembly 50--

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*